Dec. 20, 1960     K. W. PENCE     2,964,773
KITCHEN UTENSIL
Filed April 8, 1957

INVENTOR.
KATHRYN W. PENCE
BY
ATTORNEY

United States Patent Office 2,964,773
Patented Dec. 20, 1960

2,964,773

KITCHEN UTENSIL

Kathryn W. Pence, 402 S. 3rd St. W.,
Mount Vernon, Iowa

Filed Apr. 8, 1957, Ser. No. 651,427

1 Claim. (Cl. 15—245)

This invention relates to kitchen utensils in general, and more specifically to a flexible scraping device.

Flexible scraping devices are well known in the art; however, this invention is an improvement over known prior devices. This invention provides the modern household with the modern scraper. Existing flexible scrapers are not satisfactory for cleaning material from electric mixer blades. It is a tedious and difficult job to clean the material from these blades to prepare them for washing. If they are not cleaned or scraped prior to washing much costly material is wasted.

A feature of this invention is a scraper which economically and easily cleans mixer blades.

It is an object of this invention to provide a flexible scraper utensil which will satisfactorily scrape mixer blades. It is a further object of this invention to provide a multi-purpose scraper, i.e., one which cleans pots and pans as well as mixer blades.

Further objects and features of this invention will become apparent when the following description is read in conjunction with the drawing in which Figure 1 is a side view of an embodiment of this invention;

Figure 1:
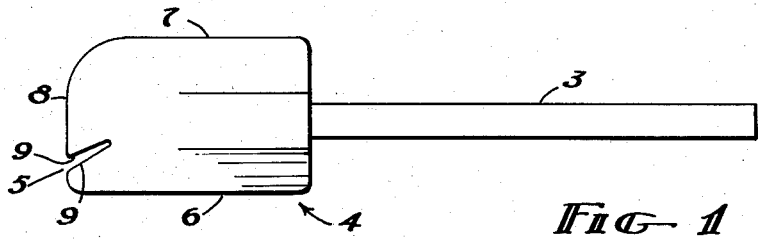
Figure 2:
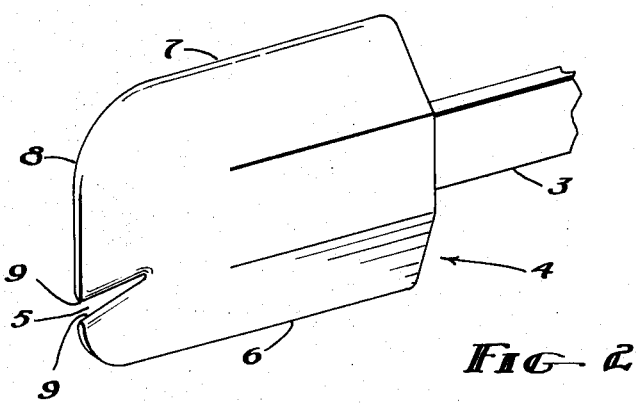
Figure 2 is an isometric view of the embodiment of Figure 1.
Figure 3:
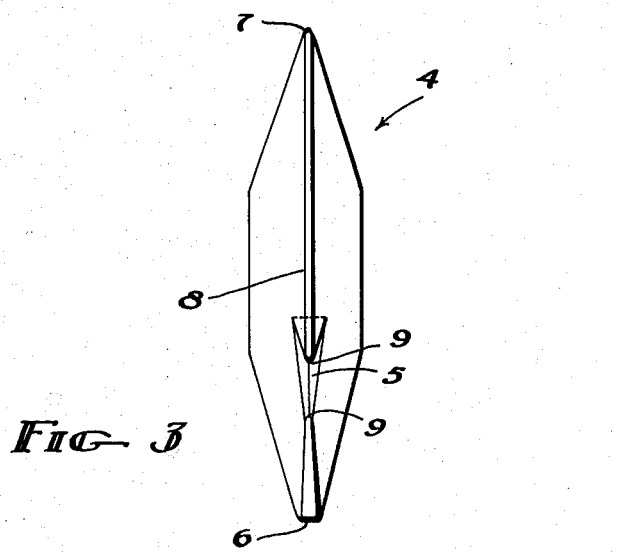
Figure 3 is an end view of the flexible member of the present invention.

This invention includes a handle member normally made of a rigid material such as wood and a flexible scraping member attached to the handle. The flexible member is normally made of rubber, but other flexible materials may be used. The sanitary requirements are that the flexible member may be washed clean in the same manner as any dish.

The handle 3 is normally fitted into an opening in the flexible scraping member 4. The flexible scraping member 4 is preferably formed with one edge 6 parallel with the handle with edge 6 being thicker than the opposite edge 7. The dimensions of one embodiment, i.e., the thickness of the sides of the member, are approximately one-eighth inch and one sixty-fourth inch.

The side opposite the handle 3 normally is contoured to conform and connect to the thickness of the two sides parallel to the handle with a substantial portion thereof being perpendicular to the handle. The corners on the side opposite the handle are normally curved so as to better scrape the rounded bottoms of pans, etc.

This invention comprises the removal of a wedge-shape piece 5 from the side opposite the handle. This opening can then be fitted around the mixer blades and maneuvered down the length of the blade, thereby scraping it clean. The wedge must be cut near the thicker edge of the scraper member and extend toward the longitudinal axis of the handle member with an angle of between 20 and 50 degrees existing between the sides of the wedge 9 and the side opposite the handle. The wedge works best if cut approximately one-half inch away from the thicker side and if the wedge is approximately three-fourths inch long.

Although this invention has been described with respect to a particular embodiment thereof, it is not to be so limited as changes and modifications may be made therein which are within the full intended scope of the invention as defined by the appended claim.

What is claimed is:

A scraping device comprising an elongated handle of rigid material, a substantially rectangular scraping member formed of flexible material, said scraping member having one side attached to said handle at right angles to the longitudinal axis thereof, said scraping member being of different thickness as between the sides parallel to the handle with smooth transition of thickness, the side opposite said handle forming a corner with sharp radius of curvature with the thicker of the sides parallel to said handle, and a corner of substantially greater radius of curvature with the thinner of the sides parallel to the handle, a wedge removed from the side opposite the handle, said wedge being cut nearer the thicker side of the sides parallel the handle and at an angle between 20° and 50° to the side opposite said handle with the longitudinal axis of said wedge extending toward the longitudinal axis of said handle.

References Cited in the file of this patent

UNITED STATES PATENTS

| | | |
|---|---|---|
| D. 30,291 | Merrill | Feb. 28, 1899 |
| 1,192,910 | Lawrence | Aug. 1, 1916 |
| 2,065,886 | Clift | Dec. 29, 1936 |
| 2,256,650 | Reid | Sept. 23, 1941 |
| 2,280,225 | Finely | Apr. 21, 1942 |
| 2,699,565 | Brough | Jan. 18, 1955 |